United States Patent
Kobayashi et al.

(10) Patent No.: US 6,352,015 B1
(45) Date of Patent: Mar. 5, 2002

(54) BOOSTER

(75) Inventors: Kazuo Kobayashi; Shintaro Uyama, both of Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/648,194

(22) Filed: Aug. 25, 2000

(30) Foreign Application Priority Data

Sep. 10, 1999 (JP) .......................................... 11-257227

(51) Int. Cl.[7] ................................................. F15B 9/10
(52) U.S. Cl. ....................................................... 91/369.2
(58) Field of Search ............................... 91/369.2, 369.3

(56) References Cited

U.S. PATENT DOCUMENTS

| | | | | |
|---|---|---|---|---|
| 3,044,449 A | * | 7/1962 | Price .......................... | 91/369.2 |
| 4,358,990 A | * | 11/1982 | Takeuchi .................. | 91/376 R |
| 4,756,231 A | * | 7/1988 | Kobayashi et al. ........ | 91/369.2 |
| 5,233,905 A | * | 8/1993 | Fecher ....................... | 91/369.2 |
| 6,269,731 B1 | * | 8/2001 | Gautier et al. | |

* cited by examiner

*Primary Examiner*—John E. Ryznic
(74) *Attorney, Agent, or Firm*—Flynn, Thiel, Boutell & Tanis, P.C.

(57) ABSTRACT

An improvement of a reaction disc 25 and a valve plunger 8 disposed in a booster is provided. A recess 25a is formed in a rear end face 25b of the reaction disc while a projection 31a from the valve plunger 8 is loosely fitted into the recess 25a. When the break booster 1 is operated, the peripheral surface and the bottom of the recess 25a abut against the projection 31a, and the rear end face 25b abuts against the end face 31c of a plunger 31, whereby a brake reaction is transmitted to an input shaft 21. When an input or a force of depressing a brake pedal is reduced during the operation, a resistance is applied to a rearward retracting movement of the valve plunger 8 by the peripheral surface of the recess 25a. The invention allows the hysteresis to be increased without increasing the hardness of the reaction disc 25.

9 Claims, 12 Drawing Sheets

BOOSTER

FIELD OF THE INVENTION

The present invention relates to a booster which is used in a brake of automobile or the like, and more particularly, to an improvement of a reaction transmission mechanism.

DESCRIPTION OF THE PRIOR ART

A booster is known in the art comprising a tubular valve body slidably disposed within a shell, a valve plunger slidably fitted into the valve body and coupled to an input shaft for movement therewith, an output shaft having a rear end which is slidably disposed within the valve body, and a reaction disc disposed between the end of the output shaft and the valve plunger for transmitting a reaction from an output acting upon the output shaft to the valve plunger, the arrangement being such that in the inoperative condition where the input shaft is not driven forward, a clearance is maintained between the reaction disc and the valve plunger.

In the conventional booster arranged in the manner mentioned above, in the operative condition where the input shaft is driven forward, the valve plunger abuts against the reaction disc, whereby a reaction from the output acting upon the output shaft is transmitted to the input shaft through the reaction disc and the valve plunger.

However, with a conventional booster as mentioned above, it is desired to have an increased hysteresis for an input in order to afford a favorable brake feeling to a driver. In addition, it is desired to increase the magnitude of the hysteresis in a greater output operating region in comparison to the magnitude of the hysteresis in a lower output operating region.

The magnitude of the hysteresis can be increased by increasing the hardness of the reaction disc of the conventional booster as mentioned above, for example.

However, when the reaction disc has an increased hardness, there results a disadvantage that a variation in the jumping value as the booster is operated or in the servo ratio increases.

SUMMARY OF THE INVENTION

In view of the foregoing, it is an object of the invention to increase the hysteresis with a simple arrangement without increasing the hardness of the reaction disc.

In accordance with the invention, the booster mentioned above further comprises resistive means which applies a resistance to the retracting movement of the valve plunger relative to the valve body in accordance with the reaction which is transmitted from the reaction disc to the valve plunger when the booster is operative where the input shaft is driven forward.

With this arrangement, in the operative condition where the input shaft is driven forward, the valve plunger retracts toward its inoperative position as an input or a force with which a brake pedal is depressed is reduced, but the resistive means applies a resistance to the retracting movement of the valve plunger in the rearward direction. Accordingly, the magnitude of a hysteresis, which represents a difference between inputs which provide an equal output as the brake pedal is depressed and released can be increased.

The resistance applied to the valve plunger is greater in a higher output operating user than in a lower output operating region.

Accordingly, the magnitude of the hysteresis can be increased without increasing the hardness of the reaction disc.

Above and other objects, features and advantages of the invention will become apparent from the following description of several embodiments thereof with reference to the attached drawings.

DETAILED DESCRIPTION OF THE EMBODIMENTS

Figure 1:
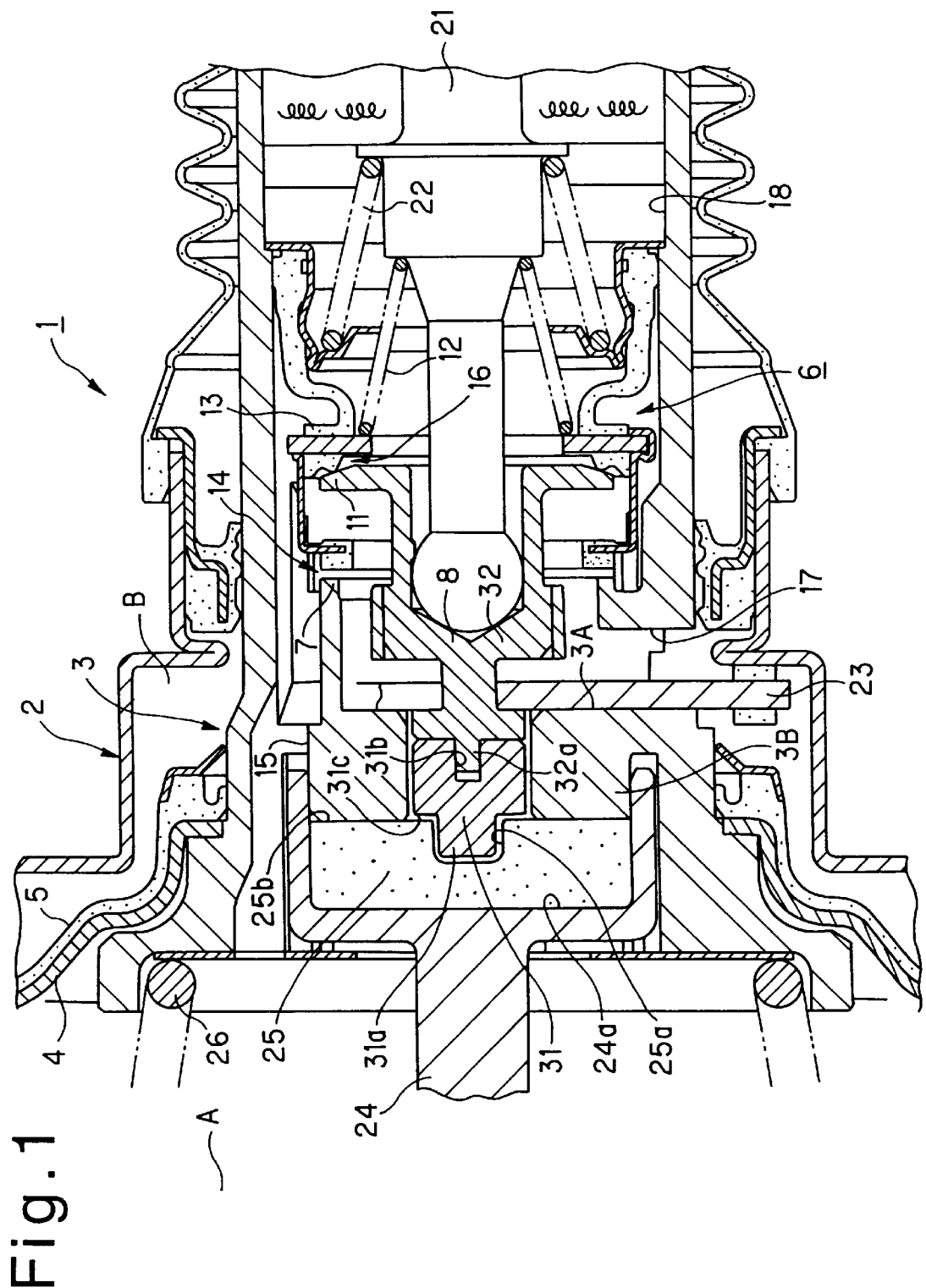
FIG. 1 is a cross section of one embodiment of the invention.

Several embodiments of the invention will now be described with reference to the drawings. Referring to FIG. 1, a brake booster 1 includes a shell 2 in which a substantially tubular valve body 3 is slidably disposed.

A power piston 4 is connected to the outer periphery of the valve body 3, and a diaphragm 5 is applied to the back surface of the power piston 4. In this manner, the interior of the shell 2 is portioned into a forwardly located constant pressure chamber A and a rearwardly located variable pressure chamber B.

A valve mechanism 6, which is known in the art, is disposed in the valve body 3. Specifically, the valve mechanism 6 comprises an annular vacuum valve seat 7 which is formed on the inner peripheral surface of the valve body 3, a valve plunger 8 slidably fitted into the valve body 3, an annular atmosphere valve seat 11 formed on the valve plunger 8, and a valve element 13 which is adapted to the be seated on the both valve seats 7 and 11 from the right, as viewed in FIG. 1, under the resilience of a spring 12.

A vacuum valve 14 is formed by the vacuum valve seat 7 and a seat area on the valve element 13 which is engaged with or disengaged from the valve seat 7. A space located radially outward of the vacuum valve 14 communicates with the constant pressure chamber A through a constant pressure passage 15 which is formed in the valve body 3. The interior of the constant pressure chamber A communicates with a source of a negative pressure, and a negative pressure is normally introduced into it.

An atmosphere valve 16 is formed by the atmosphere valve seat 11 and a seat area on the valve element 13 which is engaged with or disengaged from the valve seat 11. A space located between the atmosphere valve 16 and the vacuum valve 14 communicates with the variable pressure chamber B through a variable pressure passage 17 formed in the valve body 3.

A space located radially inward of the atmosphere valve 16 communicates with the atmosphere through an atmosphere passage 18 which is defined by the inner periphery of the valve body 3.

The valve plunger 8 is pivotally connected with the distal end of an input shaft 21, the other end of which is connected to a brake pedal, not shown. The input shaft 21 is urged rearward by the resilience of a spring 22, where it remains stationary at its inoperative position shown.

The valve body 3 has a radially opening 3A, through which a key member 23 is passed and engaged with the valve plunger 8, thus preventing the valve plunger 8 from being withdrawn rearward from within the valve body 3.

The inner periphery of the valve body 3 is formed with an annular projection 3B which projects forwardly, and an output shaft 24 is disposed forwardly of the annular projection 3B. At its one end, the output shaft 24 is formed with a recess 24a, in which a reaction disc 25 is received. The inner periphery of the recess 24a slidably fits over the outer periphery of the annular projection 3B at its rear end. In this manner, the reaction disc 25 is interposed between the bottom of the recess 24a and the end face of the annular projection 3B, and thus opposes the front end face of the valve plunger 8.

The left end of the output shaft 24 projects externally through the front wall of the shell 2 and is coupled to a piston of a master cylinder, not shown. The valve body 3 is urged rearward by a return spring 26, and thus is normally located in its inoperative position shown.

In the inoperative condition of the brake booster 1, the key member 23 abuts against the rear wall surface of the shell 2, and the valve body 3 and the valve plunger 8 both abut against the key member 23. The vacuum valve 14 is open while the atmosphere valve 16 is closed. A clearance is maintained between the front end face of the valve plunger 8 and the reaction disc 25.

The described arrangement remains unchanged from the conventional brake booster.

In the present embodiment, the configurations of the reaction disc 25 and the valve plunger 8 are improved in a manner to allow the hysteresis to be increased without increasing the hardness of the reaction disc 25.

Specifically, the rear end face 25b of the reaction disc 25 is formed in its axial portion with a circular recess 25a having a depth which is chosen to be on the order of one-half the thickness (axial length) of the reaction disc 25. In the present embodiment, the recess 25a serves as resistive means, which is effective to apply a resistance to the retracting movement of the valve plunger 8 when the brake booster 1 is operated.

On the other hand, the valve plunger 8 of the present embodiment comprises a forwardly located plunger 31 which is substantially in the form of a solid cylinder and a body 32 which is located rearward thereof.

The front end face of the plunger 31 is formed in its axial region with a forwardly projecting cylindrical projection 31a, which is loosely fitted into the recess 25a, which serves as resistive means on the reaction disc 25. The projection 31a has an external diameter which is chosen to be slightly less than the internal diameter of the recess 25a under the inoperative condition of the brake booster 1 shown in FIG. 1. In the present embodiment, the recess 25a in the reaction disc 25 defines the resistive means, which applies a resistance to the retracting movement of the valve plunger during the operation of the brake booster 1.

The rear end face of the plunger 31 is formed with an engaging opening 31b in alignment with the axis thereof. The body 32 includes a front portion having the same external diameter as the plunger 31, and an engaging projection 32a of a smaller diameter is formed on the front end face of the body 32 in alignment with the axis thereof.

The engaging projection 32a of the body 32 is a press fit into the engaging opening 31b in the plunger 31, and the front end face of the body 32 is disposed in abutment against the rear end face of the plunger 31, thus integrally connecting the plunger 31 and the body 32 together to define the valve plunger 8.

It is to be noted that the body 32 includes an axially central portion and a rear portion, which are constructed in the same manner as a conventional valve plunger. Specifically, the rear end face of the body 32 defines the atmosphere valve seat 11, and a distal portion of the input shaft 21 is pivotally connected with the rear end face of the body 32 in alignment with the axis thereof. The body 32 is centrally formed with an annular groove, which is engaged by the key member 23.

The reaction disc 25 and the valve plunger 8 of the present embodiment are constructed in the manner mentioned above. In the inoperative condition shown, the projection 31a from the plunger 31 is loosely fitted into the recess 25a in the reaction disc 25. Clearances are maintained between the bottom and the peripheral surface of the recess 25a on one hand, and the front end face and the outer periphery of the projection 31a of the plunger 31, respectively. A clearances is also maintained between the rear end face 25b of the reaction disc 25 and the opposing, front end face 31c of the plunger 31.

It is to be noted that in the present embodiment, a plurality of plungers 31 having different axial lengths are provided, and one of them is chosen in accordance with the axial size of the annular projection 3B of the valve body 3 so as to be integrally connected to the body 32. In this manner, a clearance between the rear end face 25b of the reaction disc 25 and the opposing, front end face 31c of the valve plunger 8 (or plunger 31) in the inoperative condition can be adjusted.

Description of Operation

Figure 2:
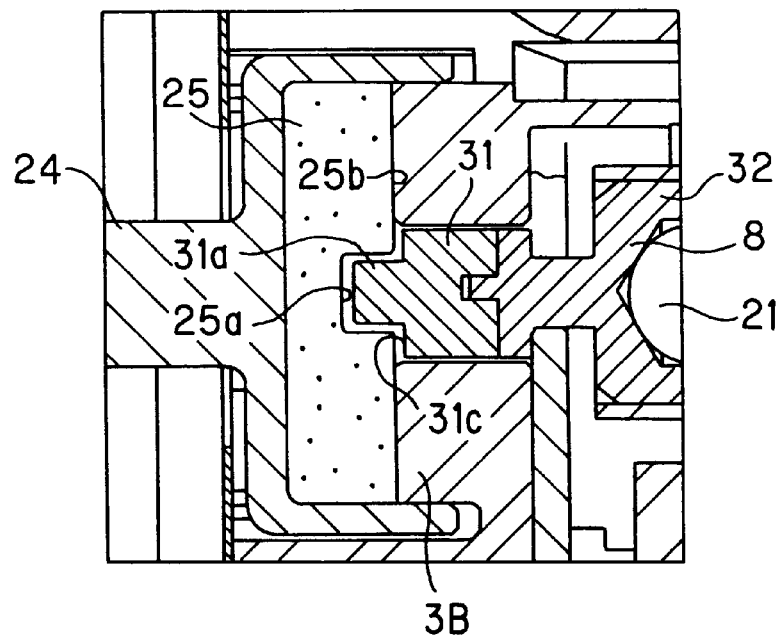
FIG. 2 is an enlarged view of an essential part shown in FIG. 1.

In the inoperative condition as shown in FIGS. 1 and 2 where the input shaft 21 is not driven forward, a clearance is maintained between the bottom of the recess 25a and the end face of the projection 31a, and a clearance is maintained between the peripheral surface of the recess 25a and the outer periphery of the projection 31a as mentioned previously. A clearance is also maintained between the rear end face 25b of the reaction disc 25 and the opposing, front end face 31c of the plunger 31. The vacuum valve 14 is open while the atmosphere valve 16 is closed. Accordingly, the constant pressure chamber A and the variable pressure chamber B are in communication, and a negative pressure is introduced into these chambers.

Figure 3:
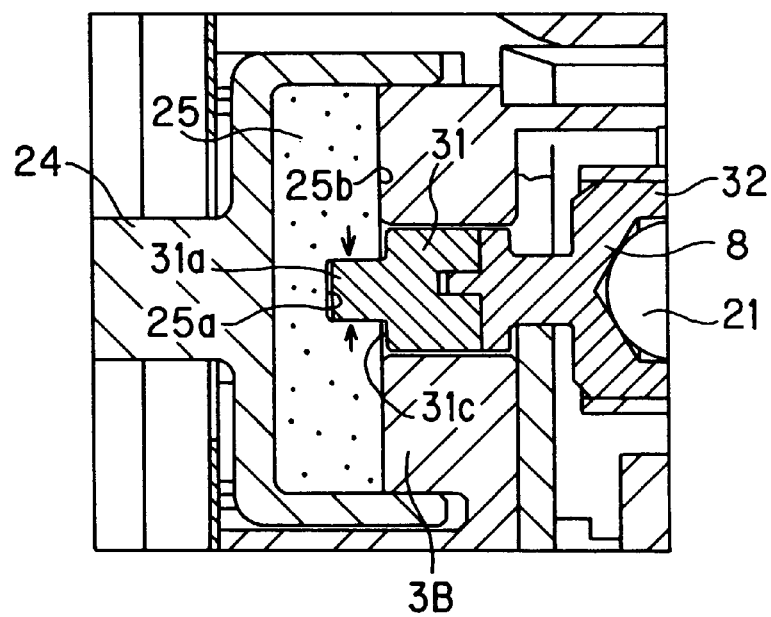
FIG. 3 is a cross section of an essential part of the embodiment shown in FIG. 1 during an operating phase.

When a brake pedal, not shown, is depressed under the inoperative condition, the input shaft 21 and the valve plunger 8 are driven forward, whereby the vacuum valve 14 is closed while the atmosphere valve 16 is opened. Accordingly, the atmosphere is introduced into the variable pressure chamber B, and a pressure differential between the atmosphere within the variable pressure chamber B and the negative pressure within the constant pressure chamber A drives the valve body 3 and the like. Under the initial condition that the input shaft 21 is driven forward, the reaction disc 25 is axially pressurized, whereby the recess 25a serving as the resistive means has its diameter reduced to cause the peripheral surface thereof to abut against the outer peripheral surface of the projection 31a, as shown in FIG. 3.

However, at this time, the end face of the projection 31a does not abut against the bottom of the recess 25a, nor the end face 31c of the plunger 31 abuts against the rear end face 25b of the reaction disc 25. Accordingly, at this point, a brake reaction acting upon the output shaft 24 is not transmitted to the input shaft 21.

Figure 4:
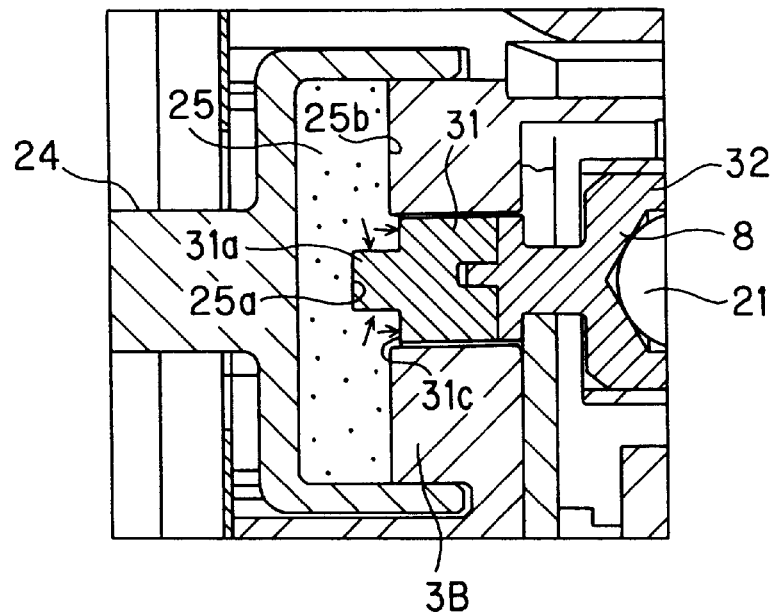
FIG. 4 is a cross section of the essential part of the embodiment shown in FIG. 1 during another operating phase.

Subsequently, as the input from the input shaft 21 increases, the end face of the projection 31a abuts against the bottom of the recess 25a, and the end face 31c of the plunger 31 abuts against the rear end face 25b of the reaction disc 25 (see FIG. 4). The peripheral surface of the recess 25a is pressed against the outer peripheral surface of the projection 31a, and the rear end face 25b of the reaction disc 25 urges the end face 31c of the plunger 31 rearward.

Accordingly, at this point in time, a reaction from the output acting upon the output shaft 24 is transmitted to the input shaft 21. This point is commonly differed to as a jumping J (see a solid line curve shown in FIG. 8) since the output then rapidly rises.

Figure 5:
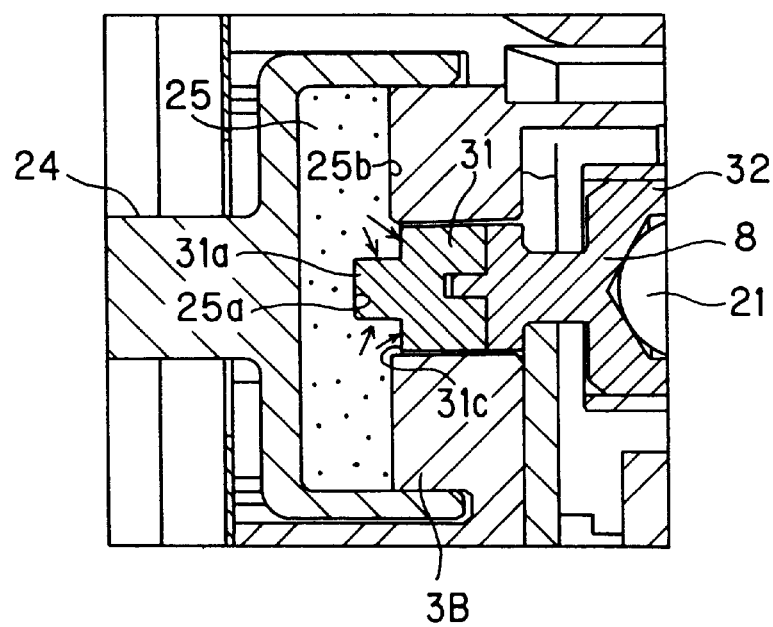
FIG. 5 is a cross section of the essential part of the embodiment shown in FIG. 1 during a further operating phase.
Figure 8:
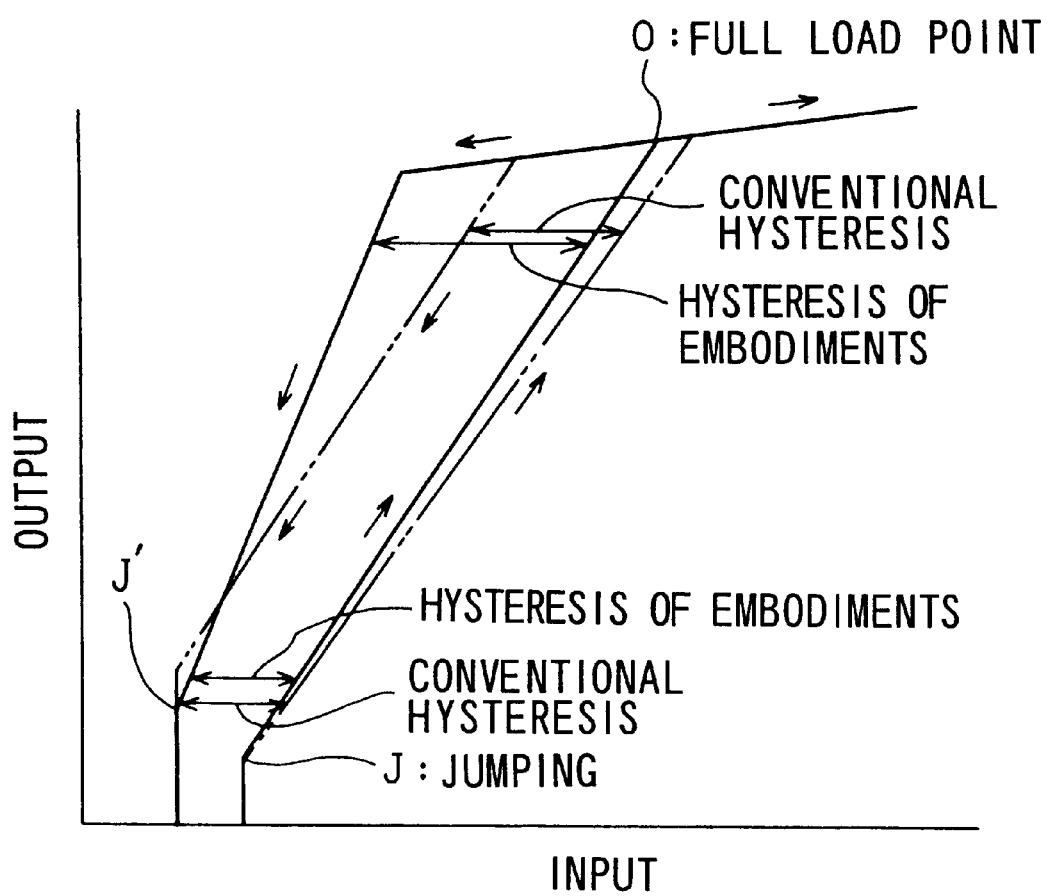
FIG. 8 is a diagram showing an input-output characteristic of the first embodiment shown in FIG. 1.

When the input from the input shaft 21 then increases, the output rises in accordance with a given servo ratio which is determined by the cross-sectional areas of the annular projection 3B and the plunger 31 (see FIG. 5 and the solid line curve of FIG. 8).

As the input from the input shaft 21 increases to a full load point 0, the output from the output shaft 24 assumes a 1:1 relationship with respect to the input from the input shaft 21, and thus the output increases with a servo ratio of 1 at and subsequent to the full load point 0 (see the solid line curve of FIG. 8).

Figure 6:
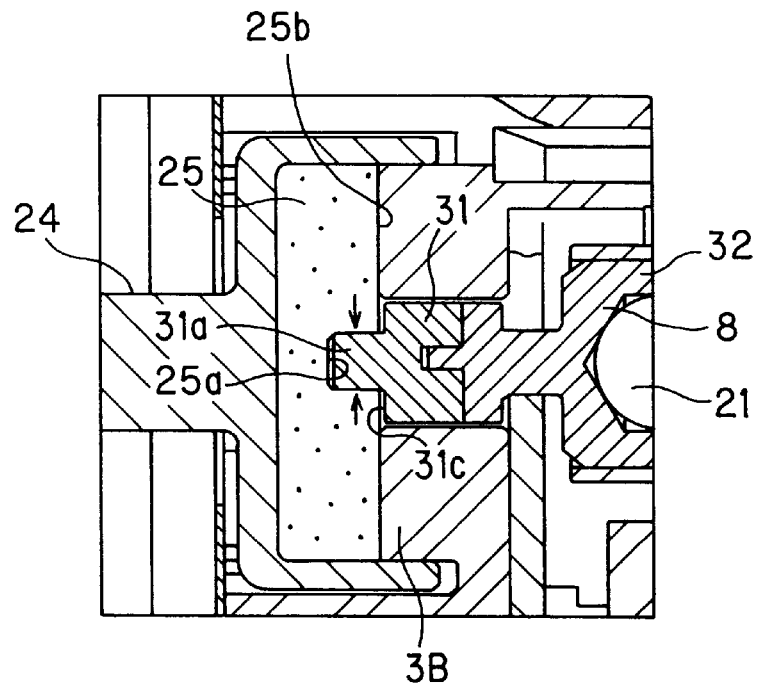
FIG. 6 is a cross section of the essential part of the embodiment shown in FIG. 1 during an additional operating phase.

If the brake pedal is now released to reduce the input applied to the input shaft 21, the valve plunger 8 retracts to move the end face of the projection 31a spaced from the bottom of the recess 25a in the reaction disc 25 and to move the end face 31c of the plunger 31 spaced from the rear end face 25b of the reaction disc 25 (see FIG. 6). Because the peripheral surface of the recess 25a is pressed against the outer peripheral surface of the projection 31a at this time, a resistance is applied to the retracting movement of the valve plunger 8. In this manner, the hysteresis, which represents a difference between inputs which provide an equal output as the brake pedal is depressed and released increases (see FIG. 8). Subsequently, as the input further decreases, the valve plunger 8 retracts toward its inoperative position, but because the peripheral surface of the recess 25a is pressed against the outer peripheral surface of the projection 31a, the valve plunger 8 retracts rearward while experiencing a resistance applied by the recess 25a serving as the resisting means (FIG. 6).

It will be noted that the peripheral surface of the recess 25a is pressed against the outer peripheral surface of the projection 31a with a greater force in a higher output operating region while the peripheral surface of the recess 25a is pressed against the outer peripheral surface of the projection 31a with a smaller force in a lower output operating region. Accordingly, the resistance which is applied by the peripheral surface of the recess 25a, which acts as a resistive means, upon the retracting movement of the valve plunger 8 is greater for a greater output (or reaction). This explains why the hysteresis is greater in a higher output operating region than in the lower output operating region as indicated in FIG. 8.

Figure 7:
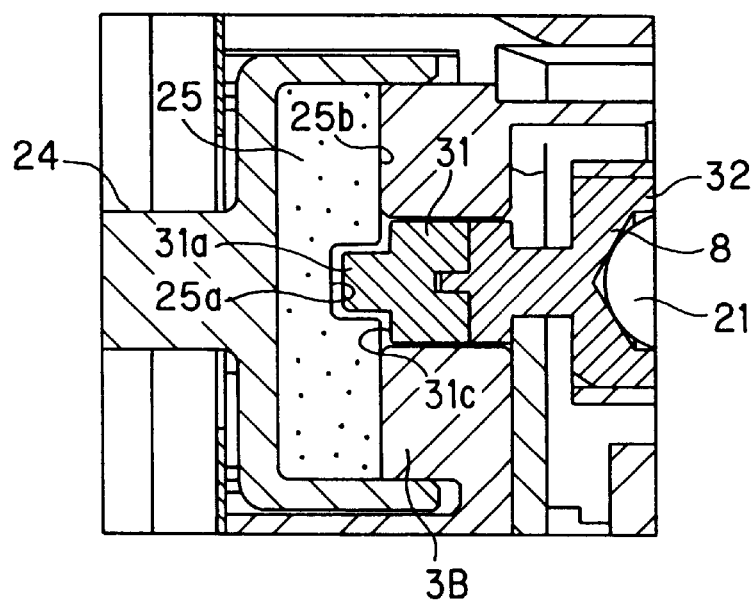
FIG. 7 is a cross section of the essential part of the embodiment shown in FIG. 1 after it has been operated.

Subsequently, when the brake pedal is completely released, the input shaft 21 and the valve plunger 8 return to their inoperative positions shown in FIGS. 1 and 2, and the recess 25a in the reaction disc 25 increases its diameter to return to its original size. Accordingly, a clearance is maintained between the peripheral surface of the recess 25a and the outer peripheral surface of the projection 31a, as shown in FIGS. 1, 2 and 7. A clearance is also maintained between the rear end face 25b of the reaction disc 25 and the end face 31c of the plunger 31.

The input-output characteristic of a conventional brake booster in which the rear end face 25b of the reaction disc 25 is entirely a flat surface and the opposing, front end face of the valve plunger 8 is also a flat surface is indicated in phantom lines in FIG. 8. It will be noted that with the conventional brake booster, the hysteresis is comparable in both a higher output operating region and a lower output operating region.

By contrast, it will be evident that according to the present embodiment, the hysteresis is increased in a higher output operating region, in particular.

Thus, with the present embodiment, the hysteresis can be increased without increasing the hardness of the reaction disc 25, while utilizing the described simple arrangement. In addition, the magnitude of the hysteresis in the higher output operating region is increased over the prior art to reduce a fluctuation in the output as the force of depression varies in a high deceleration region when a vehicle is running at a high speed, thus providing a stabilized brake feeling.

In a low deceleration region of a vehicle running, the hysteresis can be maintained small, allowing a brake feeling with controllability and a good tracking capability.

It will also be noted from FIG. 8 that the output at the jumping J when the depression is initiated and the output which prevails at the point J' which immediately precedes the complete release of the brake pedal are substantially comparable. Accordingly, the transmission of the brake reaction when the valve plunger 8 is returned to its inoperative position is continued over a longer time than in the prior art, thus permitting a delicate control of the vehicle speed and the deceleration.

According to the present embodiment, the valve plunger 8 comprises the forwardly located plunger 31 and the rearwardly located body 32, and a plurality of plungers 31 having different lengths are provided to permit a selection having a suitable length for coupling with the rear body 32. Accordingly, a clearance between the recess 25a and the projection 31a as well as a clearance between the rear end face 25b of the reaction disc 25 and the end face 31c of the plunger 31 under the inoperative condition can be adjusted. Thus, by selecting the plunger 31 of a particular length, the magnitude of the jumping J can be adjusted.

Second Embodiment

Figure 9:
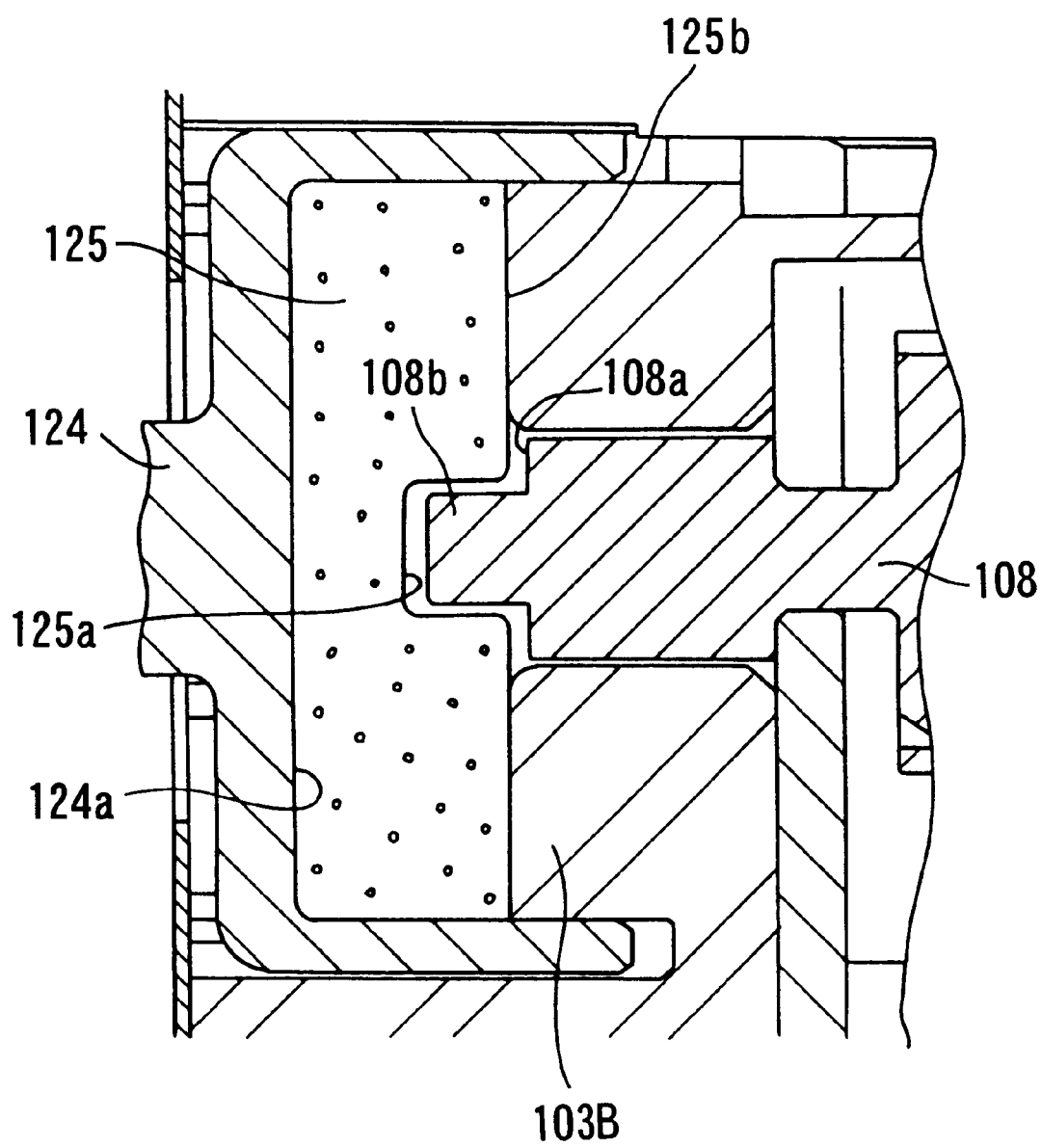
FIG. 9 is a cross section of a second embodiment of the invention.

FIG. 9 shows a second embodiment of the present invention. In the first embodiment, the valve plunger 8 comprises the plunger 31 and the body 32. However, in the second embodiment, a valve plunger 108 comprises a single member. Specifically, the valve plunger 108 has a front end face 108a, which is formed in its axial portion with a projection 108b which is loosely fitted into a recess 125a in a reaction disc 125. In other respects, the arrangement is similar to the first embodiment, and accordingly, corresponding parts to those shown in the first embodiment are designated by like numerals as used before, to which 100 is added.

The second embodiment is also capable of achieving a similar functioning and effect as achieved by the first embodiment mentioned above.

Third Embodiment

Figure 10:
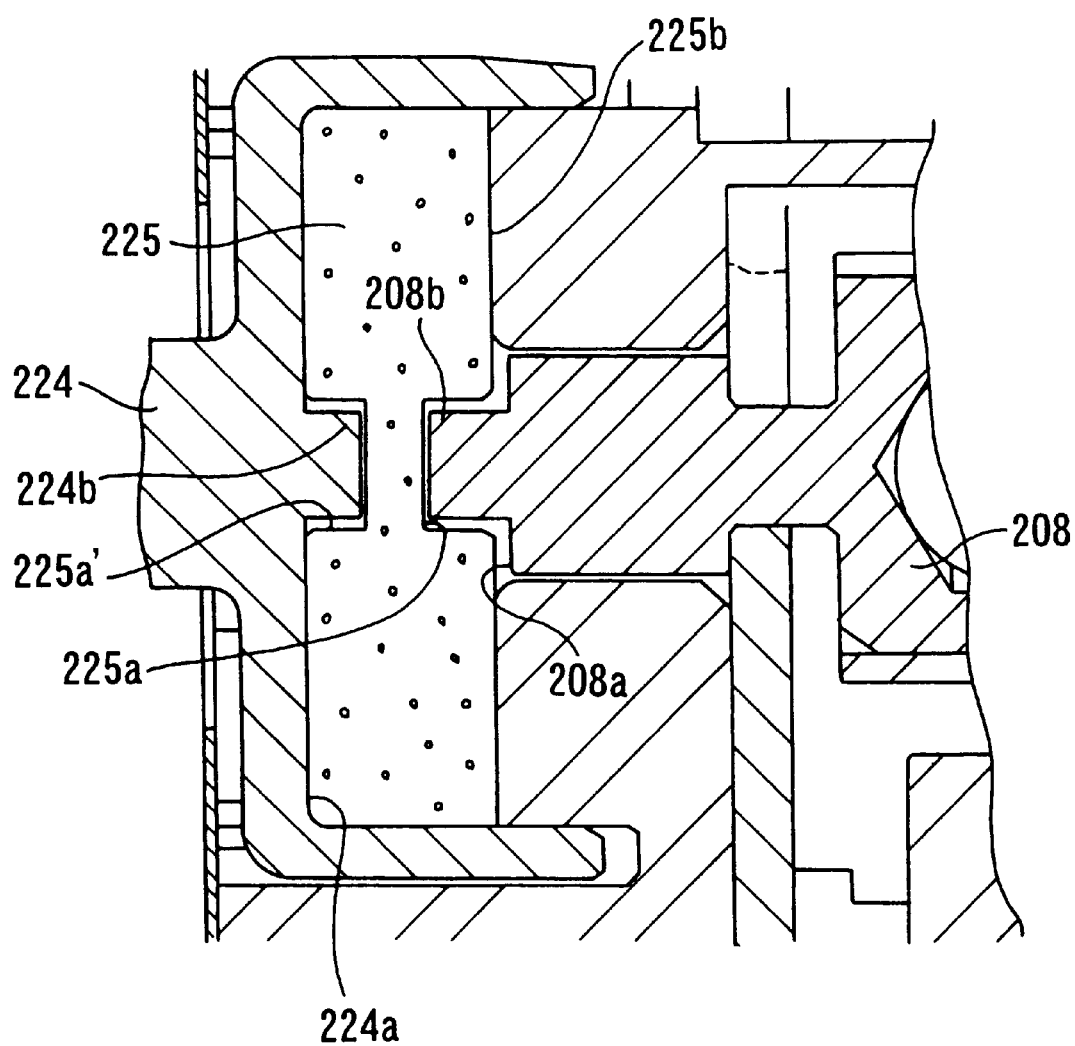
FIG. 10 is a cross section of a third embodiment of the invention.

FIG. 10 shows a third embodiment of the present invention which is based on the second embodiment shown in FIG. 9. In addition, the front end face of a reaction disc 225 is formed with a second recess 225a' in its axial portion while the bottom of a recess 224a in an output shaft 224 is centrally formed with a solid cylindrical projection 224b. The recess 225a' has a depth and an internal diameter which are chosen to be the same as the depth and the internal diameter of a recess 225a formed in a rear end face 225b. An output shaft 224 includes a projection 224b which is sized to be the same as the external diameter and the axial size of a projection 208b on a valve plunger 208. In other respects, the arrangement is similar to the second embodiment, and accordingly, corresponding parts are designated by like numerals as used in the second embodiment, to which 100 is added. In the third embodiment, the recess 225a and the recess 225a' constitute together resistive means.

The third embodiment is capable of achieving a similar functioning and effect as achieved by the second embodiment.

In addition, in the third embodiment, recesses 225a and 225a' of an equal size are formed in the front and the rear end face of the reaction disc 225, and a projection 224b is formed on the recess 224a of the output shaft 224. This allows the reaction disc 225 to be assembled in the brake booster without requiring any attention to be paid to either side of the reaction disc which should be a front side, thus facilitating the assembly operation of the brake booster as compared with the first and the second embodiment.

Fourth Embodiment

Figure 11:
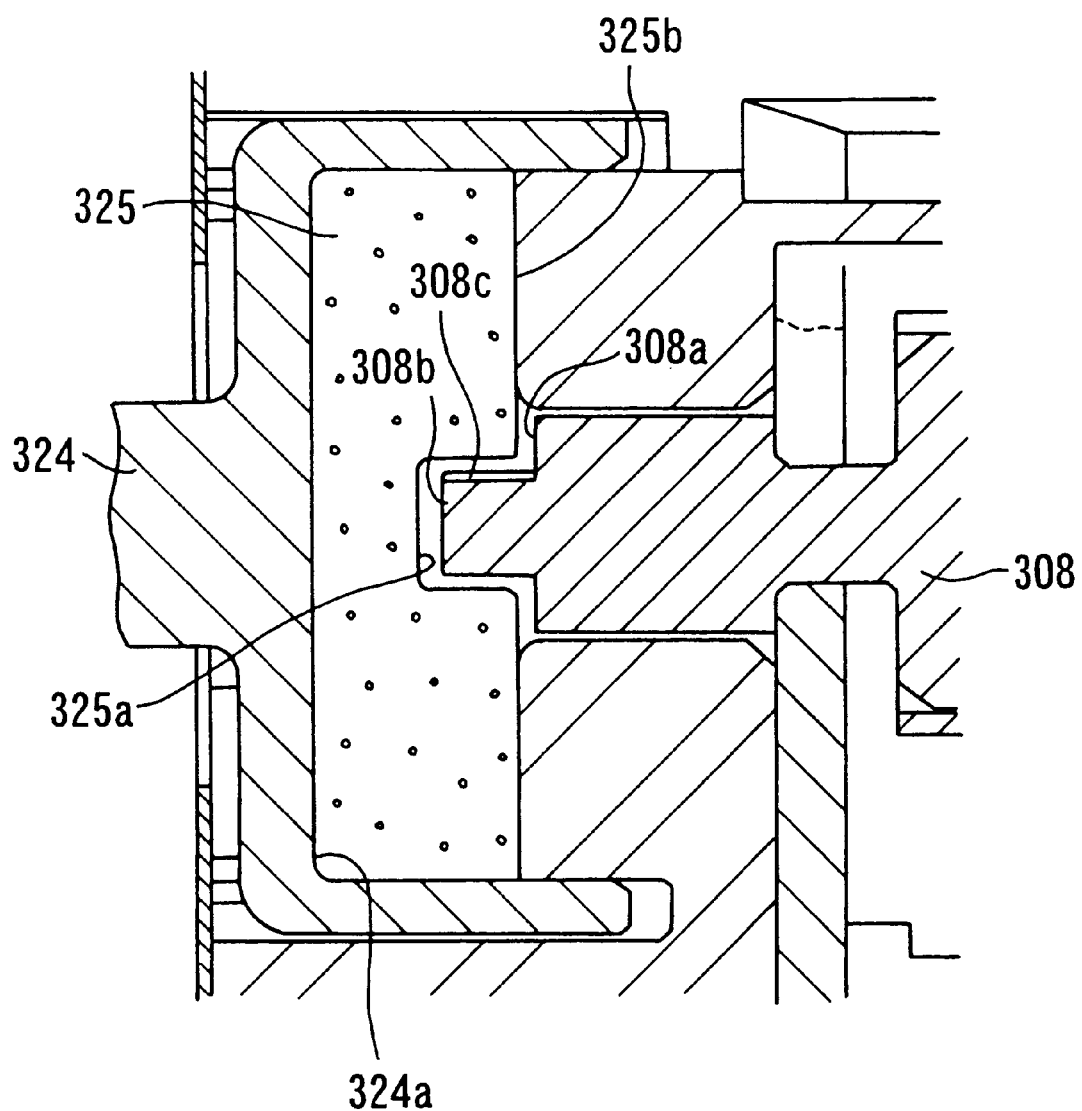
FIG. 11 is a cross section of a fourth embodiment of the invention.

FIG. 11 shows a fourth embodiment of the present invention, which is based on the second embodiment shown in FIG. 9, and in addition, an axial groove 308c is formed in the outer periphery of a projection 308b of a valve plunger 308. The axial groove 308c is formed at a plurality of locations which are circumferentially spaced apart around the outer periphery of the projection 308b, and extends over the full axial length of the projection 308b. In other respects, the arrangement is similar to the second embodiment shown in FIG. 9, and accordingly, corresponding parts to those shown in FIG. 9 are designated by like reference numerals as used in FIG. 9, to which 200 is added.

The fourth embodiment is capable of achieving a similar functioning and effect as achieved by the second embodiment.

In addition, in the fourth embodiment, the provision of the axial grooves 308c in the projection 308b allows the air within a recess 325a which is located forwardly of the axial grooves to be vented rearward of a rear end face 325b of a reaction disc 325 through the axial grooves 308c when the peripheral surface of the recesses 325a in a reaction disc 325 is pressed against the outer peripheral surface of the projection 308b.

Similar axial grooves may be formed in the outer periphery of the projection 31a of the plunger 31 when the valve plunger 8 comprising the plunger 31 and the body 32 as shown in FIG. 1 is used.

Fifth Embodiment

Figure 12:
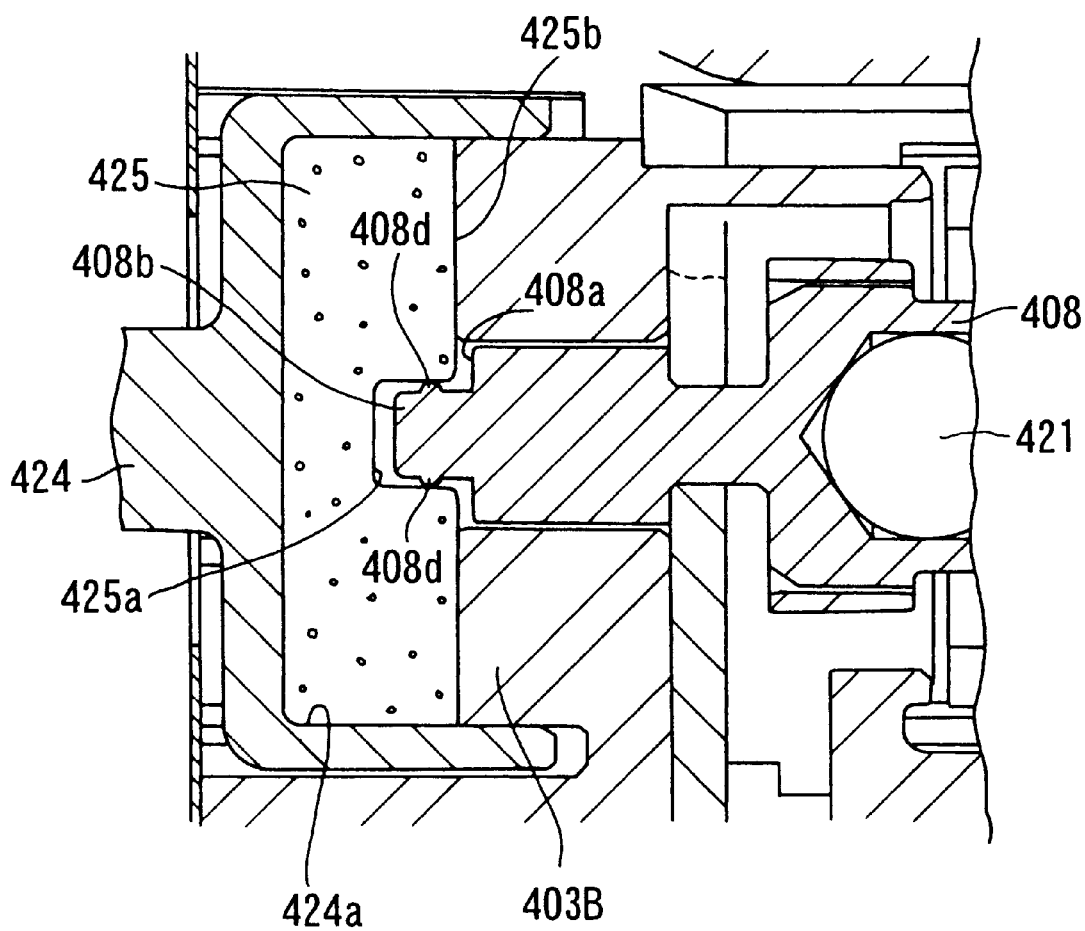
FIG. 12 is a cross section of a fifth embodiment of the invention.

FIG. 12 shows a fifth embodiment of the present invention, which is based on the second embodiment shown in FIG. 9, and a plurality of semispherical dowels 408d are formed so as to be circumferentially spaced apart around a projection 408b. In other respects, the arrangement is similar to the second embodiment, and accordingly, parts corresponding to those shown in the second embodiment are designated by like reference numerals as used before, to which 300 is added. It is to be noted that the plurality of semispherical dowels 408d may be replaced by a circumferentially continuous annular projection.

The fifth embodiment is capable of achieving a similar functioning and effect as achieved by the second embodiment.

In addition, the plurality of dowels 408d are formed around the projection 408b and are embedded into the peripheral surface of a recess 425a when the peripheral surface of the recess 425a of a reaction disc 425 is pressed around the outer periphery of the dowels 408b. This further increases the resistance presented to the movement of a valve plunger 408 which returns rearward, thus further increasing the hysteresis.

Sixth Embodiment

Figure 13:
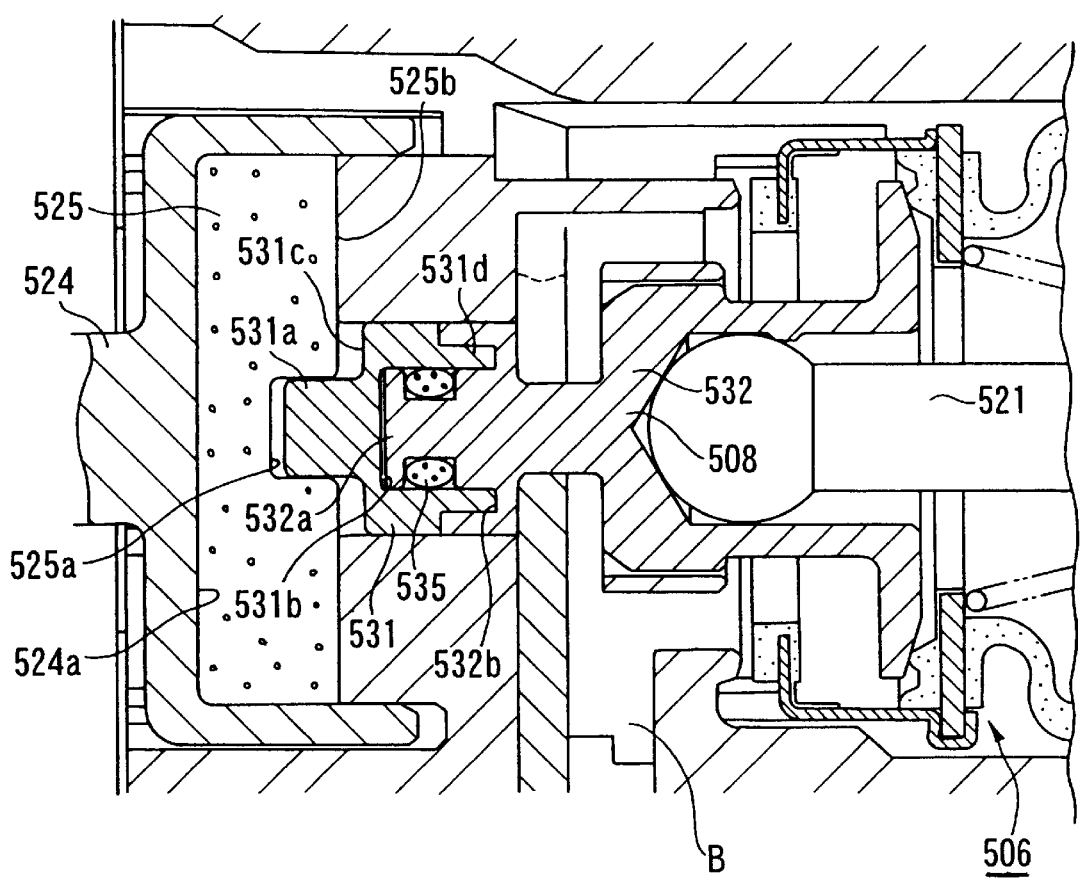
FIG. 13 is a cross section of a sixth embodiment of the invention.

FIG. 13 shows a sixth embodiment of the present invention which is a modification of the embodiment shown in FIG. 1 in that an axial relative movement is permitted between the plunger 31 and the body 32 which constitute together the valve plunger 8. Specifically, a body 532 has an engaging projection 532a of a greater external diameter than in the first embodiment, and in a corresponding manner, a plunger 531 has an engaging opening 531b having a greater internal diameter.

An annular groove 532b having a given depth is formed in the front end face of the body 532 around the inner peripheral edge while an annular projection 531d is formed on the rear end face of the plunger 531 around the inner peripheral edge. The engaging projection 532a of the body 532 is slidably fitted into a recess 531b in the plunger 531 while simultaneously causing the annular projection 531d of the plunger 131 to be slidably fitted into the annular groove 532b in the body 532.

In addition, an annular groove is formed around the outer periphery of the engaging projection 532a, and an annular friction member 535 which is formed of rubber is mounted in the annular groove. Since the friction member 535 is placed in contact with the inner peripheral surface of the engaging opening 531b, as an axial relative sliding movement occurs between the engaging projection 532a and the engaging opening 531b, a resistance is applied to the relative movement between these members. In other respects, the arrangement is similar to the first embodiment mentioned above, and accordingly, corresponding parts are designated by like reference numerals as used before, to which 400 is added.

In the sixth embodiment, the recess 525a in the reaction disc 525 and the friction member 535 constitute together resistive means.

According to the sixth embodiment, the hysteresis is increased by causing the projection 531a to be clamped by the peripheral surface of the recess 525a of the reaction disc 525, and a resistance is applied to the retracting movement of the body 532 as the body 532 retracts rearward as a result of a contact of the friction member 535 with the peripheral surface of the engaging opening 531b in the plunger 531. Consequently, a greater hysteresis can be obtained than in the first embodiment.

While no path is formed in the sixth embodiment to equalize the pressure in a space defined by the engaging opening 531b in the plunger 531 and the end face of the engaging projection 532a of the body 532 with the pressure in the variable pressure chamber B, such path may be provided in any one of the friction member 535, the plunger 531 and the body 532.

Seventh Embodiment

Figure 14:
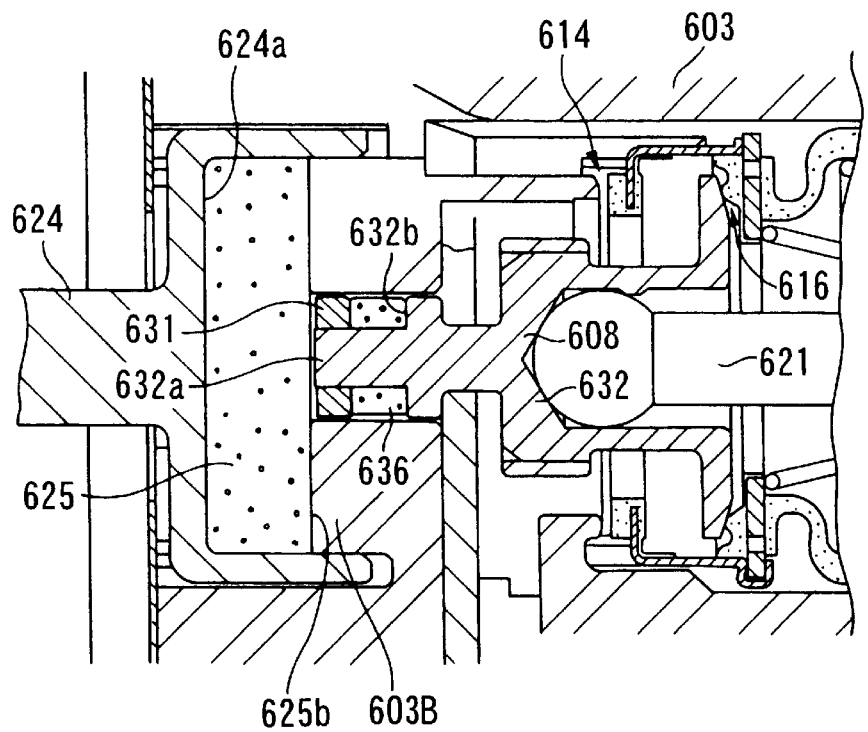
FIG. 14 is a cross section of a seventh embodiment of the invention.

FIG. 14 shows a seventh of the present invention. In the first to the sixth embodiment, resistive means is formed by the recess 25a (125a, 225a, 325a, 425a or 525a ) of the reaction disc, but in the present embodiment, a valve plunger 608 is associated with a resilient member 636 which serves as resistive means.

Specifically, in the seventh embodiment, a reaction disc 625 has a disc configuration in the similar manner as conventional. However, the valve plunger 608 comprises an annular member 631 which is substituted for the plunger 31 shown in FIG. 1, and a body 632 which is similar to the body shown in FIG. 1.

In the present embodiment, the body 632 includes an engaging projection 632a which extends axially forward for a length which is longer than in FIG. 1. The engaging projection 632a is in the form of a solid cylinder on which an annular resilient member 636 is fitted from the front side, followed by an annular member 631 which is slidably mounted on the engaging projection 632a. In this manner, the resilient member 636 is interposed between the annular member 631 and a stepped end face 632b of the body 632. Under a natural condition, the resilient member 636 has an external diameter which is less than the external diameter of the annular member 631 and the external diameter of the body 632 at a location where the stepped end face 632b is formed. In other respects, the arrangement is similar to the first embodiment shown in FIG. 1, and accordingly, corresponding parts to those shown in the first embodiment are designated by like reference numerals as used before, to which 600 is added.

In the inoperative condition of the brake booster shown in FIG. 14, the resilient member 636 assumes its natural condition and is not axially compressed. Under this condition, a slight clearance is maintained between the outer peripheral surface of the resilient member 636 and the inner peripheral surface of a valve body 603. The engaging projection 632a has a front end face which projects forwardly beyond the annular member 631, but the front end faces of both the engaging projection 632a and the annular member 631 are spaced from the rear end face 625b of the reaction disc 625.

Figure 15:
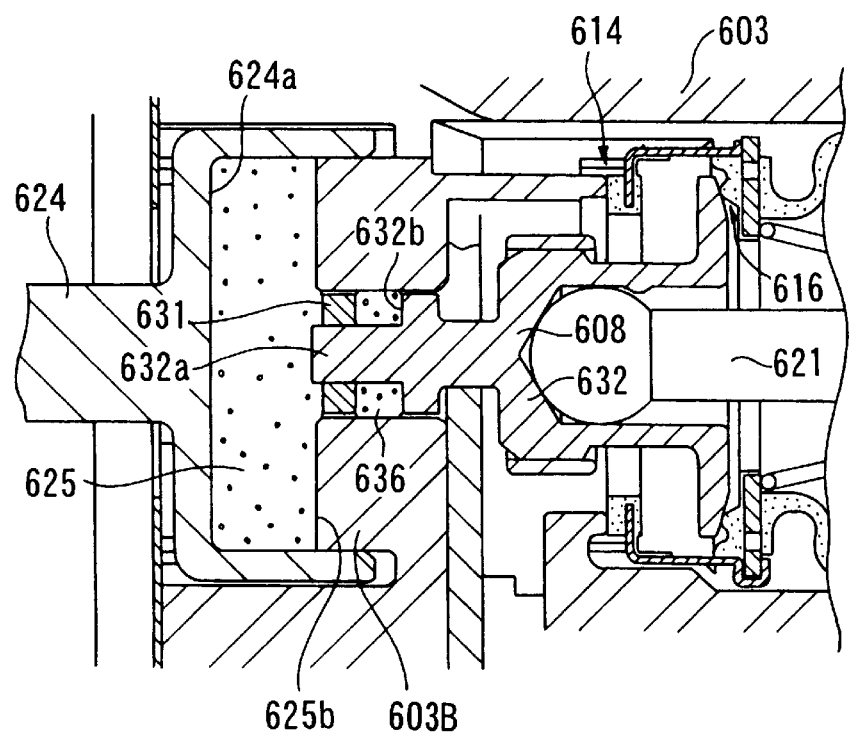
FIG. 15 is a cross section showing an operating phase of the seventh embodiment.

By contrast, when an input shaft 621 is driven forward to operate the brake booster, the rear end face 625b of the reaction disc 625 bulges rearward in its axial portion to abut against the front end faces of the engaging projection 632a and the annular member 631 as shown in FIG. 15, thus displacing the annular member 631 rearward with respect to the engaging projection 632a of the body 632. This causes the annular member 631 and the stepped end face 632b to compress the resilient member 636 in the axial direction to cause it to bulge radially outward, with its outer periphery being pressed against the inner peripheral surface of the valve body 603. If the brake pedal is now released under this operated condition to release the input to the input shaft 621, the valve plunger 608 retracts, but because the outer periphery of the resilient member is pressed against the inner peripheral surface of the valve body 603, a resistance is applied to the retracting movement of the valve plunger 608.

Accordingly, the seventh embodiment is capable of achieving a similar functioning and effect as achieved by the first embodiment. In addition, the construction of the valve plunger 608 in the manner mentioned above allows the hysteresis to be increased with the simple arrangement. In addition, by changing the hardness and the external diameter of the resilient member of the resilient member 636, the point in time during the operation of the brake booster when the outer periphery of the resilient member 636 is to be pressed against the inner peripheral surface of the valve body 603 can be adjusted.

Eighth Embodiment

Figure 16:
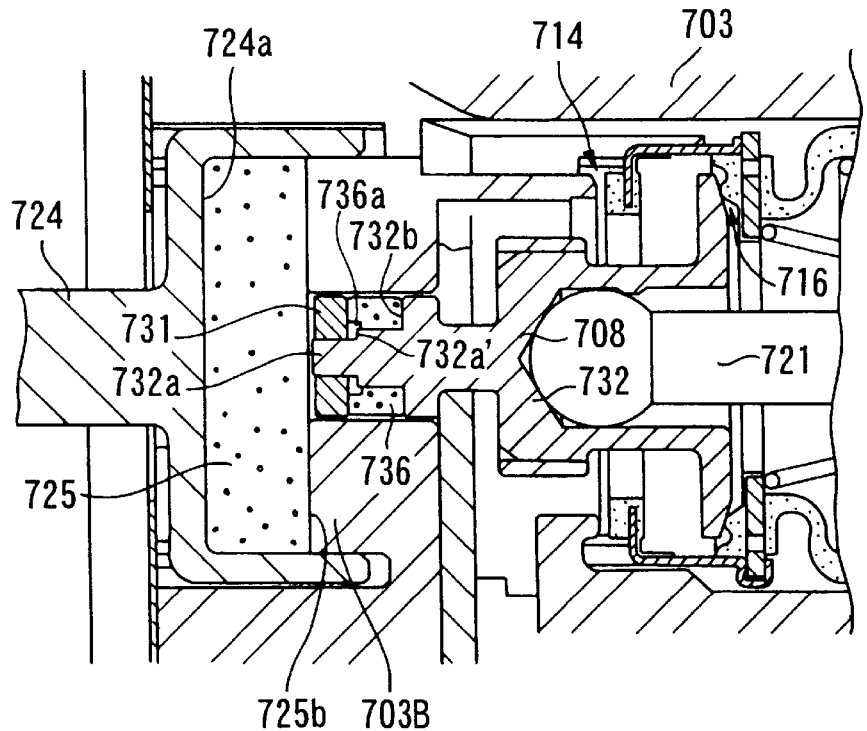
FIG. 16 is a cross section of an eighth embodiment of the invention.

FIG. 16 shows an eighth embodiment of the present invention, which represents an improvement of the engaging projection 632a of the body 632 and the resilient member 636 of the seventh embodiment shown in FIG. 14. Specifically, an engaging projection 732a has a reduced diameter at its front portion than at its rear portion, thereby forming a step 732a ' toward the axial center of the engaging projection 732a. A resilient member 736 is formed with an annular recess 736a around its inner periphery at its front edge. The resilient member 736 is fitted over a rear portion of a greater diameter of the engaging projection 732a while an annular member 731 is slidably fitted over a front portion of a reduced diameter of the engaging projection 732a. In the inoperative condition shown in FIG. 16, the rear end face of the annular member 731 is spaced from the opposing end face of the step 732a ', and the annular recess 736a of the resilient member 736 surrounds the step 732a '. In this manner, an annular space is maintained between the rear end face of the annular member 731 and the end face of the step 732a'.

Figure 17:
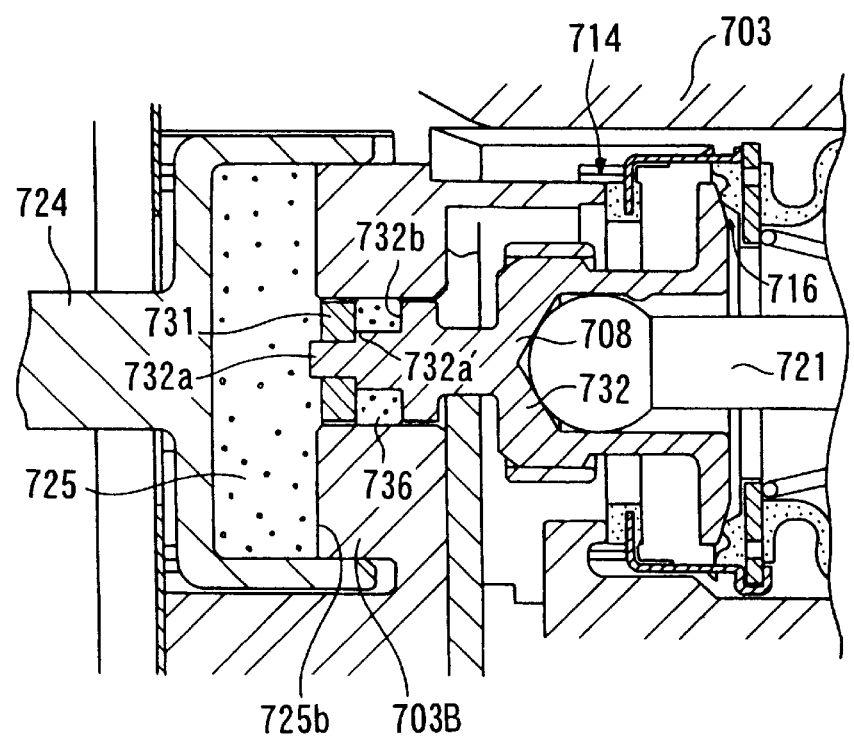
FIG. 17 is a cross section of showing an operating phase of the eighth embodiment.

By contrast, in the operative condition of the brake booster as shown in FIG. 17 where an input shaft 721 is driven forward, a reaction disc 725 which bulges rearward displaces the annular member 731 rearward with respect to the engaging projection 732a, but the rearward movement of the annular member 731 relative to the engaging projection 732a is limited by the abutment of the annular member 731 against the end face of the step 732a '. At this time, the resilient member 736 is axially compressed to remove the annular recess 736a and the outer periphery of the resilient member 736 is pressed against the inner periphery of a valve body 703. In other respects, the arrangement is similar to the seventh embodiment mentioned above, and accordingly, corresponding parts to those shown in the seventh embodiment are designated by like reference numerals as used before, to which 100 is added.

The eighth embodiment is capable to achieving a similar functioning and effect as achieved by the seventh embodiment.

In addition, in the eighth embodiment, the provision of the step 732a' allows a softer material to be used for the resilient member 736. The use of the softer resilient member 736 allows an adjustment such that the resilient member 736 is pressed against the inner periphery of the valve body 703 for a low input while suppressing the hysteresis for a higher input.

In addition, since the resilient member 736 is formed with the annular recess 736a, it is possible to prevent the resilient member 736 from being bitten between the annular member 731 and the step 732a' in a favorable manner.

While the invention has been disclosed above with respect to several embodiments thereof, it should be understood that a number of changes, modifications and substitutions therein are possible from the above disclosure without departing from the spirit and the scope of the invention defined by the appended claims.

What is claimed is:

1. A booster including a tubular valve body slidably disposed within a shell, a valve plunger slidably fitted into the valve body and coupled with an input shaft for movement therewith, an output shaft having a rear end which is slidably mounted in the valve body, and a reaction disc interposed between said rear end of the output shaft and the valve plunger for transmitting a reaction from an output acting on the output shaft to the valve plunger, the arrangement being such that in an inoperative condition where the input shaft is not driven forward, a clearance is maintained between the reaction disc and the valve plunger;

further comprising resistive means for applying a resistance to a retracting movement of the valve plunger relative to the valve body in accordance with a reaction which is transmitted from the reaction disc to the valve plunger during an operation of the booster where the input shaft is driven forward.

2. A booster according to claim 1 in which the rear end face of the reaction disc is formed with a recess at a location which opposes the valve plunger, while a front end of the valve plunger is fitted into the recess, thereby allowing the recess to serve as the resistive means, the arrangement being such that in an inoperative condition where the input shaft is not driven forward, the end face of the valve plunger at its front end is spaced from the bottom of the recess while in an operative condition of the booster where the input shaft is driven forward, the bottom and the peripheral surface of the recess abuts against the front end face and the outer peripheral surface of the valve plunger.

3. A booster according to claim 2 in which the valve plunger comprises a forwardly located plunger having a front projection which is inserted into the recess, and a body which is located rearward of the plunger, the plunger being formed with an engaging opening in its rear end face while the body has an engaging projection formed on its axial front portion, which engaging projection is a press fit into the engaging opening, the opposing end faces of the both members being disposed in abutment against each other, thus integrally connecting them together.

4. A booster according to claim 2 in which the front end face of the reaction disc is formed with a second recess which is similar to the recess formed in the rear end face, the rear end of the output shaft being centrally formed with a projection which is fitted into the first mentioned recess or the second recess.

5. A booster according to claim 2 in which the outer periphery of the projection is formed with an axial groove.

6. A booster according to claim 2 in which the outer periphery of the projection is formed either with an annular projection or a plurality of projections which are spaced apart circumferentially.

7. A booster according to claim 2 in which the valve plunger comprises a forwardly located plunger and having a front projection which is fitted into the recess, and a body which is located rearward of the plunger, the rear end face of the plunger being formed with an engaging opening while the body has a front axial portion on which an engaging projection is formed and is slidably fitted into the engaging opening, the engaging projection having an annular groove formed in its outer periphery in which an annular friction member is mounted to apply a resistance to a sliding movement between the engaging projection and the engaging opening.

8. A booster according to claim 1 in which the valve plunger comprises a forwardly located annular member, a body located rearward of the annular member and having a front engaging projection which slidably extends through the annular member from the rear side thereof, and an annular resilient member fitted over the engaging projection of the body and interposed between a stepped end face adjacent to and rearward of the engaging projection and the annular member, the resilient member defining the resistive means, the arrangement being such that in an operative condition of the booster where the input shaft is driven forward, the reaction disc causes the annular member to be displaced rearward along the engaging projection, whereby the resilient member serving as the resistive means is axially compressed to move into contact with the inner peripheral surface of the valve body.

9. A booster according to claim 8 in which the engaging projection of the valve plunger is formed with a step at a given axial position, and as the annular member is displaced rearward with respect to the engaging projection of the valve plunger, the annular member abuts against the step to control a limit of the axial compression of the resilient member.

* * * * *